(12) United States Patent
Marold

(10) Patent No.: US 9,528,772 B2
(45) Date of Patent: Dec. 27, 2016

(54) MULTI-PASSAGE THERMAL SHEET AND HEAT EXCHANGER EQUIPPED THEREWITH

(76) Inventor: Freimut Joachim Marold, Dorsten (DE)

( * ) Notice: Subject to any disclaimer, the term of this patent is extended or adjusted under 35 U.S.C. 154(b) by 436 days.

(21) Appl. No.: 12/864,916

(22) PCT Filed: Jan. 28, 2009

(86) PCT No.: PCT/EP2009/000540
§ 371 (c)(1),
(2), (4) Date: Sep. 8, 2010

(87) PCT Pub. No.: WO2009/095221
PCT Pub. Date: Aug. 6, 2009

(65) Prior Publication Data
US 2011/0127010 A1 Jun. 2, 2011

(30) Foreign Application Priority Data

Jan. 28, 2008 (EP) .................................. 08001544

(51) Int. Cl.
*F28D 15/00* (2006.01)
*F28D 9/00* (2006.01)
(Continued)

(52) U.S. Cl.
CPC ........... *F28D 9/0031* (2013.01); *B01D 5/0015* (2013.01); *B01D 5/0057* (2013.01); *B01J 19/249* (2013.01);
(Continued)

(58) Field of Classification Search
CPC .... F28D 1/0408; F28D 9/0093; F28D 9/0006; F28D 9/0031; F28F 3/12
(Continued)

(56) References Cited

U.S. PATENT DOCUMENTS

| RE16,953 E * | 5/1928 | Appleby ........................ 165/168 |
| 2,383,292 A | 8/1945 | Dalzell et al. |

(Continued)

FOREIGN PATENT DOCUMENTS

| DE | 43 33 904 A1 | 3/1995 |
| DE | 44 16 645 A1 | 11/1995 |

(Continued)

*Primary Examiner* — Steven B McAllister
*Assistant Examiner* — Ko-Wei Lin
(74) *Attorney, Agent, or Firm* — Chalin A. Smith; Smith Patent LLC

(57) ABSTRACT

The present invention concerns a novel thermal sheet, which is divided into at least two passages by means of rolling or welding seams, and thermal sheet modules constructed thereof, wherein the passages are connected through common feed and discharge lines for a cooling or heating agent supply. Such thermal sheets are referred to as multi-passage thermal sheets.

The present invention concerns further a heat exchanger having an outer cover, at least two heat transfer modules, at least one of which represents a multi-passage thermal sheet module according to the invention, and feed and discharge lines for a cooling or heating agent supply which are connected with the heat transfer modules, wherein the feed and discharge lines within the outer cover of the heat exchanger are brought together.

11 Claims, 9 Drawing Sheets

(51) Int. Cl.
*B01D 5/00* (2006.01)
*B01J 19/24* (2006.01)
*F28F 13/06* (2006.01)

(52) U.S. Cl.
CPC ........... *F28D 9/0006* (2013.01); *F28D 9/0093* (2013.01); *F28F 13/06* (2013.01); *B01J 2219/2453* (2013.01); *B01J 2219/2462* (2013.01); *B01J 2219/2474* (2013.01); *B01J 2219/2481* (2013.01)

(58) Field of Classification Search
USPC ....................... 165/181, 145, 104.11, 104.14, 165–167,165/140, 168, 144, 164, 173, 175; 122/273, 122/259; 137/597
See application file for complete search history.

(56) References Cited

U.S. PATENT DOCUMENTS

| | | | |
|---|---|---|---|
| 2,431,820 A * | 12/1947 | Montgomery | 202/235 |
| 3,796,547 A * | 3/1974 | Muenger | 422/200 |
| 4,594,227 A | 6/1986 | Ohsaki | |
| 4,636,365 A * | 1/1987 | Link et al. | 422/201 |
| 5,205,348 A * | 4/1993 | Tousignant et al. | 165/46 |
| 6,089,313 A * | 7/2000 | Levy et al. | 165/140 |
| 6,305,466 B1 * | 10/2001 | Andersson et al. | 165/140 |
| 6,460,614 B1 * | 10/2002 | Hamert et al. | 165/170 |
| 6,732,728 B2 * | 5/2004 | Hill et al. | 126/110 R |
| 6,817,407 B2 * | 11/2004 | Wagner et al. | 165/166 |
| 6,982,066 B2 * | 1/2006 | Filippi et al. | 422/198 |
| 7,268,254 B2 * | 9/2007 | Olbert et al. | 562/598 |
| 7,380,544 B2 * | 6/2008 | Raduenz et al. | 123/568.12 |
| 7,392,837 B2 * | 7/2008 | Makino et al. | 165/140 |
| 7,472,744 B2 * | 1/2009 | Gorbounov et al. | 165/178 |
| 7,727,493 B2 * | 6/2010 | Filippi et al. | 422/200 |
| 7,730,616 B2 * | 6/2010 | Goller et al. | 29/890.03 |
| 8,215,378 B2 * | 7/2012 | Nash et al. | 165/82 |
| 8,272,429 B2 * | 9/2012 | Inatomi et al. | 165/135 |
| 2003/0098075 A1 * | 5/2003 | Possanza et al. | 137/597 |
| 2004/0031592 A1 * | 2/2004 | Mathias et al. | F28D 9/0093 165/104.19 |
| 2004/0067414 A1 * | 4/2004 | Wei et al. | 429/166 |
| 2005/0020851 A1 * | 1/2005 | Olbert et al. | 562/545 |
| 2005/0061490 A1 * | 3/2005 | Filippi et al. | 165/145 |
| 2005/0252645 A1 | 11/2005 | Filippi et al. | |
| 2006/0099118 A1 * | 5/2006 | Filippi et al. | 422/148 |
| 2007/0199339 A1 * | 8/2007 | Ishihara et al. | 62/242 |
| 2008/0314574 A1 * | 12/2008 | Filippi et al. | 165/167 |
| 2010/0018672 A1 * | 1/2010 | Yang | 165/104.11 |

FOREIGN PATENT DOCUMENTS

| | | |
|---|---|---|
| DE | 10 2004 005863 A1 | 9/2005 |
| EP | 1 306 126 A | 5/2003 |
| WO | WO 2005/063616 A | 7/2005 |

* cited by examiner

MULTI-PASSAGE THERMAL SHEET AND HEAT EXCHANGER EQUIPPED THEREWITH

This application corresponds to the national phase of International Application No. PCT/EP2009/000540 filed Jan. 28, 2009, which, in turn, claims priority to European Patent Application No. 08.001544.9 filed Jan. 28, 2008, the contents of which are incorporated by reference herein in their entirety.

The present invention concerns a novel thermal sheet, which is divided into at least two passages by means of rolling or welding seams, and thermal sheet modules constructed thereof, wherein the passages are connected through common feed and discharge lines for a cooling or heating agent supply. Such thermal sheets are referred to as multi-passage thermal sheets.

The present invention concerns further a heat exchanger having an outer cover, at least two heat transfer modules, at least one of which represents a multi-passage thermal sheet module according to the invention, and feed and discharge lines for a cooling or heating agent supply which are connected with the heat transfer modules, wherein the feed and discharge lines within the outer cover of the heat exchanger are brought together.

When chemical reactions as well as evaporation and condensation processes are performed in heat exchangers the reaction heat is often withdrawn or fed with a cooling or heating agent, wherein the cooling or heating agent is passed through heat transfer modules, for example consisting of pipe coils, tube nests, or thermal sheets. In performing chemical reactions the heat exchangers represent reactors, in performing evaporation and condensation processes they represent condensers, such as for example head condensers.

Heat transfer modules particularly of thermal sheets are already known, and are often employed in large-scale processes.

For example reactors particularly to perform partial oxidations using thermal sheets are described in DE-A 199 52 964, DE-C 197 54 185, DE-A 198 48 208, and WO A 01/85331. Especially advantageous plate reactors are also described in EP-A 1 002 571, which concerns a reactor for performing reactions with strong heat tonality. In the reactors described therein, several thermal sheets, between which catalyst particles can be incorporated, are arranged next to each other in the reactor vessel so that they form a thermal sheet module of plate packages, in which the feed gas flows through the plate packages in parallel. Such a modular assembly has great advantages for the reaction control. In particular, in such reactors individual thermal sheet modules can be replaced and maintained, so that in case of a damaged thermal sheet module or maintenance work the reactor has to be switched off for only a short time, during which the thermal sheet module is changed. Specific reactors permit also the withdrawal of individual thermal sheet modules, and the further reaction control in the reactor without these thermal sheet modules.

In EP-A 1 221 339 there is described a heat exchanger wherein thermal sheets are designed in an advantageous modular construction. By doing so, the thermal sheet modules are smaller than a manhole, which is located on the reactor.

However, for specific applications often more variable and better adjustable temperature controls would be desirable than they can be achieved with the known thermal sheets and thermal sheet modules.

It is therefore object of the present invention to provide thermal sheets that can be operated more flexible, and thus are also suitable for specific applications, which are not performable or only with difficulties with the known thermal sheets.

A further object of the present invention is to provide a heat exchanger having an outer cover, at least 2 heat transfer modules, and feed and discharge lines for a cooling or heating agent supply, which are connected with the heat exchanger modules to perform chemical reactions as well as evaporation and condensation processes with strong heat tonality, that does not exhibit the above-mentioned disadvantages.

This problem is solved by the object of the claims.

The invention concerns a thermal sheet divided into at least two passages 51, 52, 53 by means of rolling or welding seams as well as a module 100 of such thermal sheets wherein the individual passages are connected by common feed and discharge lines 4a, 4b, 4c, 5a, 5b, 5c.

In a preferred embodiment the thermal sheet according to the invention is designed such that at least one of the passages is provided with flow spoilers 61, which makes it easier to control the flow within the passages specifically. Preferably, these flow spoilers 61 can be prepared by rolling or welding seams.

In a further preferred embodiment the rolling and welding seams 62 between two passages are interrupted at least one point, so that a fluid exchange can take place between the two passages.

In the state of the art, a thermal sheet module always consists of one-passage thermal sheets combined to one passageway. In the multi-passage thermal sheet modules according to the invention several thermal sheet sections are each combined to one passageway. The multi-passage thermal sheets according to the invention have a number of advantages over the one-passage thermal sheets known from prior art, showing in particular when the thermal sheets according to the invention are integrated to thermal sheet modules.

The thermal sheet modules according to the invention permit a heat exchange also between more than two media. Theoretically, the number of media is not restricted (only by the number of passages), but in view of practicality and functionality it amounts to two to five different media. By differently sized passages within one thermal sheet module it is possible to further combine very small volume flows with large volume flows in one and the same thermal sheet module with each other. Thus, the parameters of volume flow and flow rate of the media are controllable separately from one another. Instead operating several heat exchangers, different cycles of media can be integrated in one single thermal sheet module with the thermal sheet modules according to the invention, which means a high economic advantage and enables a flexible process control in a small space. Also a combination of gas and liquid channels in one module is quite possible. Both evaporation and condensation, and deposition of solids (sublimation, crystallization etc.) are possible every time in the heat exchanger both outside and inside of the passages.

Thus, also in the case of using only one medium the use of the multi-passage thermal sheets according to the invention provides considerable advantages. So, the various passages of the thermal sheets may have different volumes and optionally different paths for the medium conditional on flow spoilers what makes it possible to adjust different temperature profiles within a thermal sheet module.

Additionally, the thermal sheet modules according to the invention are not only suited for the supply of cooling and heating agents but also for chemical and physical reactions taking place within the thermal sheets. Due to the optional interruptions of the rolling or welding seams the media of adjacent passages may contact each other and enter into a chemical or physical reaction. Hereby, reactants can be supplied at precisely defined positions within the thermal sheets. Moreover, the possible supply of side flows at ideal temperature level can prevent temperature overlappings (Pinch) in the QT-course. Further, the thermal sheets according to the invention permit a tap for draining media at precisely defined temperatures.

Additionally, in the thermal sheets according to the invention very high pressures in individual cross-sections are possible.

Moreover, with the thermal sheets according to the invention it is possible to optimize the single cross-sections within the apparatus, whereby comparatively very high heat transmission coefficients can be realized.

The multi-passage thermal sheets according to the invention can be easily prepared from known single-passage thermal sheets by dividing a conventional single-passage thermal sheet by means of rolling or welding seams 54 into several passages 51, 52, 53. Each passage is then provided with feed and discharge lines in the known manner, as is shown in the FIGS. 5 to 9.

There is no particular restriction for the number of passages of a thermal sheet according to the invention, but at least two passages have to be present. The maximum number of passages is only restricted by the desired use and the size of the thermal sheets, but is as a rule not more than ten, preferably not more than seven.

Of particular advantage are thermal sheets with two, three, four, or five passages, in particular with two or three passages.

The individual passages can cover different sized areas of the thermal sheets, by which for example different volume flows can be combined.

As explained herein before, it is possible to pass different media through the individual passages for the purpose of heat supply or heat removal. The different media may have widely varying heat capacity. Media having minor heat capacity may be for example passed through a passage faster than media having correspondingly greater heat capacity since with media having lower heat capacity a shorter space of time is required to supply or remove the required amount of heat.

According to the invention, in different passages even media having different states of aggregation may be used, such as gaseous and liquid. Moreover, in reactions changes in the state of aggregation and substance are possible.

Preferably, the individual passages 51, 52, 53 of the thermal sheets according to the invention run vertical, so that also a natural circulation will be possible, and exhibit openings at their upper and lower ends by which they are connected with the feed and discharge lines 4a, 4b, 4c and 5a, 5b, 5c of the media. The way of media in the adjacent passages of the thermal sheet according to the invention may be in the same direction but also in opposite direction. Moreover, the way of the media within the passages may be affected by different formations of the longitudinal seams 54. The longitudinal seams represent rolling or welding seams which separate the individual passages. Depending on what is required they may have a straight or other formed way. So, the way may be designed curve-shaped or with several bends. These different ways of the longitudinal seam and the seam separating the adjacent passages, respectively, affect and control the way of the media within the passages and the retention time of media within the passages.

For further control of the way of the media within a passage 51, 52, 53 flow spoilers 61 may be applied. Suitably, such flow spoilers are also produced by rolling or welding seams. These flow spoilers represent deflections within one passage of one thermal sheet according to the invention. The flow spoilers are not particularly restricted in their form. With that, the flow spoilers can form flow channels for the medium, and the channels defined by the flow spoilers can be arbitrary oriented, in particular may run meander or diagonal. A particular design is straight-line flow spoilers that are transverse relative to the medium's flow direction within the thermal sheet.

Moreover, it is possible that the individual passages 51, 52, 53 of the thermal sheet according to the invention do not cover the whole area of the thermal sheet. In this case, at least one of the longitudinal seams 54 does not end at least one side at the upper or lower edge of the thermal sheet, respectively (exemplary for a vertical way of the passages). This is shown in FIG. 8 wherein the right passage 52 represented in the picture does not extend to the bottom edge of the thermal sheet according to the invention. Accordingly, the feed or discharge line 4c intended for this passage is located at the lateral edge of the thermal sheet and accordingly, the adjacent passage 52 extends around the area, by which the other has been shortened. The combination of differently designed deflections and longitudinal seams is conditional on the desired process control and permits the adjustment of complex temperature profiles in thermal sheet modules.

In one embodiment the longitudinal seams 62 separating the passages 51, 52, 53 of the thermal sheets according to the invention are interrupted at certain points 63. These interruptions 63 represent connections between adjacent passages 51, 52, i.e. the medium that is passed through the passage can get into the passage connected therewith and vice versa. In this way, a mixture of the media will be allowed which can be passed through the connected passages. The interruptions may have arbitrary sizes, by which the degree of intermixing can be adjusted in dependence of what is desired. It is noted, that more than one interruption may be present. In this way, within the thermal sheets according to the invention also chemical reactions can be performed. Therefore, the media passed through the connected passages may contain educts and reactants and chemical reactions may take place once they have reached the other passage by the interruption of the longitudinal seam. By combining carefully the designs of the longitudinal seams, the deflections, and the placing of the interruptions in the longitudinal seams for specific chemical reactions optimum conditions in view of the temperature at the time of mixing, the progress of the temperature gradient, and the degree of mixing of the media may be achieved. This may of particular advantage for kinetically controlled reactions.

The thermal sheets according to the invention are preferably integrated to modules and thus form the thermal sheet module 100 according to the invention. The number of the so in dependence of thermal sheets according to the invention is not particularly restricted and depends on the operational requirements. The thermal sheets present in a thermal sheet module are as a rule similarly constructed in view of the combination of the applied rolling or welding seams 54, 61, 62. The correlating passages of the thermal sheets in the thermal sheet module according to the invention are connected by common feed and discharge lines 4a, 4b, 4c, 5a, 5b, 5c.

A further aspect of the invention relates to a heat exchanger 30 having an outer cover 2, at least two heat transfer modules 3, at least one of which is a thermal sheet module 100 in accordance to the present invention, and feed and discharge lines 4, 5 for the supply of cooling or heating agents which are connected with the heat transfer modules 3, wherein the feed and discharge lines 4, 5 are brought together within the outer cover 2 of the heat exchanger 30. Preferably, within the outer cover the feed lines are interconnected, further preferred the feed and discharge lines. When several multi-passage thermal sheet modules according to the invention are present in a heat exchanger 30 according to the invention the thermal sheet sections 51, 52, 53 of a thermal sheet module interconnected to a feed and discharge line 4a, 4b, 4c, 5a, 5b, 5c are preferably connected with the respective feed and discharge line 4a, 4b, 4c, 5a, 5b, 5c of the further thermal sheet module according to the invention. It is also possible that two or more of the feed and discharge lines 4a, 4b, 4c, 5a, 5b, 5c of the same thermal sheet module are connected with each other. Hereby it is understood that only the passages of thermal sheets with common feed and discharge lines are connected through which the same medium is passed.

In the following, the invention is described in detail on the basis of the simplest embodiment, wherein all feed lines 4a, 4b and 4c are integrated to one common feed line 4 and all discharge lines 5a, 5b and 5c are integrated to one common discharge line 5, that is, only one medium is used. Unless stated explicitly otherwise or is apparent for the person skilled in the art however, these embodiments apply analogously also for the arrangements in accordance to the invention, wherein only one or none of the feed and discharge lines 4a, 4b, 4c, 5a, 5b and 5c can be integrated, e.g. since in the different passages different media are passed.

As mentioned above, reactants and educts may flow through the thermal sheets according to the invention, so that a chemical reaction takes place within the thermal sheets. This embodiment is of particular relevance in case the rolling or welding seams dividing the thermal sheets into several passages exhibit interruptions that permit a fluid transfer between adjacent passages. However, as a rule a heating or cooling agent flows through the thermal sheets according to the invention and this preferred embodiment is described substantially in the following.

In a preferred embodiment the feed or discharge lines 4, 5 connected with the heat transfer modules 3 are connected with each other by means of a steam drum 33 within the outer cover 2 of the heat exchanger 30. In the case of several different media and thus different cooling and heating agent cycles in the multi-passage thermal sheet modules according to the invention there is as a rule only one closed cooling and heating agent cycle connected with the steam drum.

In a further preferred embodiment the steam drum 33 is completely arranged within the outer cover 2.

In another preferred embodiment the steam drum 33 may be separated from the central cooling or heating agent supply and withdrawn from the heat exchanger 30 in a vertical direction.

In a further preferred embodiment the heat transfer modules 3 may be separated from the central cooling or heating agent supply and the central cooling or heating agent supplies, respectively and withdrawn from the heat exchanger 30 in a vertical direction.

In a still further preferred embodiment the cooling or heating agent supply may be operated in the natural circulation.

In a still further preferred embodiment the heat exchanger 30 represents a condenser and has at least one secondary condenser 36.

In another preferred embodiment for each heat transfer module 3 a secondary condenser 36 is arranged within the outer cover 2 of the heat exchanger 30.

By the construction according to the invention the capacity of heat exchangers can be increased, whereas still an advantageous cooling or heating agent supply is guaranteed and ensured that the modules 3 as well as the optionally present steam drum 33 can be removed from the heat exchanger in an easy manner and may be maintained. This is achieved in that several heat transfer modules are arranged within an outer cover 2, wherein the feed and/or discharge lines of the cooling and heating agent supply, respectively of the heat transfer modules are connected within the outer cover. In this way, a closed cooling or heating agent system is formed within the heat exchanger and the heat exchanger needs only one central in- or outflow for the cooling or heating agent. Thus, the outer cover of the heat exchanger can be easily prepared and thermal stresses are avoided, and the outer cover used does not depend on the number of modules that are employed. Thus, outer covers can be standardized. Moreover, by the closed cooling or heating agent supply a natural circulation is particularly easy to realize, wherein the cooling or heating agent is moved through the cooling or heating agent system by temperature gradients and the use of a pumping system is unnecessary.

The heat exchanger 30 according to the invention is specifically suited for the use of an integrated steam drum 33 in the cooling or heating agent system. The use of steam drums in connection with heat exchangers for the production of steam is well known to person skilled in the art. When used in a head condenser, a steam drum may be used for the separation of the various phases of the cooling agent (liquid/gaseous) and for the adjustment of the desired pressure in the cooling agent system. In reactors, the steam drums can also serve for the adjustment of the pressure in the cooling or heating agent system and thus, for providing process heat or removing process heat. Depending on the process temperatures in the steam drums may for example run pressures from vacuum up to 160 bar at temperatures from up to 400° C. In this way, highest pressures and an optimum supply or removal of the process heat are possible in the cooling or heating agent system. At the same time, optimum heat-transfer coefficients on the side of the media and products, respectively may be achieved and in particular drops of pressure and yield may be avoided.

In the heat exchangers 30 according to the invention the steam drums 33 are either completely or partially arranged within the outer cover of the heat exchanger. By this construction, the spaces between the fixed points of the heat exchanger and thus the thermal stress can be reduced. Preferably, the steam drum may be completely arranged within the outer cover of the heat exchanger to achieve the shortest spaces between the fixed points. In this way, there is also achieved a particularly compact construction of the heat exchanger.

In a particular advantageous embodiment of the invention the steam drum 33 is arranged such that it can be pulled out upwards from the heat exchanger 30 after the feed line has been disengaged. As a rule, the steam drum is connected detachable with the feed and discharge line of the cooling and heating agent 4, 5, respectively, especially by screwing.

After the removal of the steam drum the heat transfer modules 3 may be taken out in the same way, preferably separately, for repair or maintenance work and for purification. By this construction, it is sufficient to provide one opening and apparatus cap 34 in the outer cover 2 of the heat exchanger, respectively through which the steam drum and a heat transfer module fit, respectively. Moreover, by the removal of the steam drum the free space may be formed that is required for the removal of the heat transfer modules. This construction is particularly advantageous in that large apparatus caps are expensive and complex in their preparation. That's why it is advantageous to maintain the apparatus caps and the thus provided openings in the outer cover as small as possible. Moreover, this can be achieved in an advantageous way in that the steam drum forms part of the apparatus cap and thus closes a part of the opening in the outer cover of the heat exchanger by itself.

A further advantage of the heat exchangers 30 according to the invention results from the arbitrary shape of the heat transfer modules and the outer cover of the heat exchanger. This enables special adaptations of the heat exchanger to individual operational requirements in a simple way.

Thermal sheets are known in the art and like the thermal sheets according to the invention may be combined to units, so called heat transfer modules, i.e. thermal sheet modules. The term "heat transfer module" as used herein means such an unit of several combined thermal sheets through which cooling or heating agents (or medium, respectively) can flow and which has a feed and discharge line for the cooling or heating agent supply and hence forms a unit. In case of multi-passage thermal sheets the term heat transfer module means in accordance to the invention the thermal sheets the respective passages of which are each combined to one passageway. Hence, the heat transfer modules can have more than one feed and discharge line for a cooling or heating agent supply, but at most as much as the number of the present passages.

The heat exchanger according to the invention contains at least two, more preferred at least three, still more preferred at least four, more preferred at least five, still more preferred six or more heat transfer modules within the outer cover. The heat transfer modules may have an arbitrary design, wherein at least one multi-passage thermal sheet module according to the invention is used.

A thermal sheet module is defined by the arrangement of the connected thermal sheets that have a common in- and outlet for a cooling or heating agent.

The heat transfer modules 3 are preferably arranged within the outer wall of the heat exchanger 30 such that they can be removed from the heat exchanger. The heat transfer modules are connected with the feed and discharge lines 4, 5 for the cooling or heating agent supply (or for the supply of reaction media, respectively) and additionally preferably with suitable fixing devices of the heat exchanger. Preferably, the heat transfer modules are suspended on a frame in the heat exchanger.

To remove the individual heat transfer modules 3 it is required to separate these from feed and discharge lines 4, 5 of the cooling or heating agent supply and the fixing devices. The feed and discharge lines of the heat transfer modules can be connected in any way with the cooling or heating agent supply and the fixing devices of the heat exchanger 30, respectively. The term "separate" as used herein comprises the disengagement of closures such as for example threaded closures. Preferably, the heat transfer modules are connected detachable by known closure mechanisms, so that the heat transfer modules can be removed and subsequently attached again or fixed, respectively, in a simple way.

When using the heat exchanger 30 as head condenser, it is preferred that the heat transfer modules 3 are provided with collectors 10, 31 for the condensation products. The collectors may be attached underneath the heat transfer modules and preferably are connected within the outer cover 2 of the heat exchanger and moreover, have a common discharge line 11, 32 out of the heat exchanger. Preferably, the heat transfer modules arranged in one plane have a common discharge line out of the heat exchanger. Suitable collectors are known to a person skilled in the art.

Preferably, the feed line 4 for a cooling or heating agent supply which is connected with a heat transfer module 3 is applied to the bottom of the heat transfer module. By this feed line a cooling or heating agent can be passed to the heat transfer module. After passing through the heat transfer module the cooling or heating agent is re-passed from the heat transfer module via the discharge line 5 which also is connected with the heat transfer module.

The feed and/or discharge lines 4, 5 for a cooling or heating agent supply are brought together within the outer cover 2 of the heat exchanger 30. Preferably, the feed lines are brought together within the outer cover. As a rule and most preferably, both the feed lines to the individual heat transfer modules within the outer cover and the discharge lines from the individual heat transfer modules are brought together. According to the invention in this way the greatest advantage is achieved that only one opening for a feed line and one opening for a discharge line has to be provided in the outer cover of the heat transfer module.

This means that die feed lines (or the discharge lines, respectively) for a cooling or heating agent supply at a point within the outer cover come together or are connected by a vessel or a pipe, so that an integrated cooling or heating agent system is formed. Preferably, the feed lines (and discharge lines) can be separated from the heat transfer modules and the cooling or heating agent system can be closed such that the cooling or heating agent supply can even further be operated when one or more heat transfer modules were removed from the heat exchanger. Suitable means for connecting the feed or discharge lines for a cooling or heating agent supply with the heat transfer modules as well as suitable closures for the feed and discharge lines are known in the art, threaded closure is preferred.

In case of the thermal sheet modules according to the invention with which several cooling or heating agent cycles can be operated, i.e. when the feed and discharge lines 4a, 4b, 4c, 5a, 5b, 5c of a thermal sheet module are not connected with each other, only one opening for one feed line and one opening for one discharge line for each separated cooling or heating agent cycle has to be provided, irrespective of whether how much thermal sheet modules according to the invention are employed in the heat exchanger.

In the present description the feed lines as a rule are indicated with the reference mark 4 and the discharge lines with the reference mark 5. However, in the practice of the thermal sheet modules according to the invention of course it is also possible that the feeding takes place via the connection 5 and the discharging via the connection 4, in particular when the media in different passages of the thermal sheet module are passed counter-directional.

When the heat exchanger 30 comprises a steam drum 33 then it is preferred that the discharge line 5 for a cooling or heating agent supply of the heat transfer modules 3 leads to the steam drum. Additionally preferred is that the discharge lines for a cooling or heating agent supply are connected with the steam drum such that it can be separated therefrom and the steam drum can be removed from the heat exchanger.

Steam drums 33 suitable for the heat exchanger 30 according to the invention are known in the art, wherein reference may be made for example to the latest VDI Wärmeatlas. The steam drum is completely or partially arranged within the outer cover 2 of the heat exchanger. Preferably, the steam drum is connected with the feed and discharge lines 4, 5 for a cooling or heating agent supply of the heat transfer modules or the cooling or heating agent system, respectively, so that a cooling or heating agent can flow out of the steam drum via the feed lines into the heat transfer modules. Subsequently, the cooling or heating agent flows through the discharge lines out of the heat transfer modules and preferably back into the steam drum. This results in a closed cooling or heating agent system. Further preferred, the steam drum has a feed line 42 for a cooling or heating agent to the outside to provide the heat exchanger with "fresh" cooling or heating agent. Further preferred, the steam drum has a discharge line 39 for a cooling or heating agent out of the cooling or heating agent system to the outside. Through this discharge line either steam or liquid cooling or heating agent may be removed from the heat exchanger.

The term "cooling or heating agent system" as used herein comprises all components such as pipes, heat transfer modules 3, steam drum 33, etc. of the heat exchanger 30, through which the cooling or heating agent is passed during the running of the heat exchanger. Here, the cooling or heating agent system may have additional components such as for example a pumping system as well as further in- or outflows, respectively to the outside. Preferably, the cooling or heating agent system has an outflow line 32 through the outer cover of the heat exchanger to the outside. Through this outflow line the cooling or heating agent may be withdrawn for example after the running of the heat exchanger or to replace the cooling or heating agent during the running of the heat exchanger. Preferably, the outlet of the outflow line is arranged at a point in the outer cover of the heat exchanger, that is localized underneath the heat transfer modules 3, 100, so that the cooling or heating agent can be easily removed from the cooling or heating agent system. Additionally preferred is that the cooling or heating agent system comprises an inflow permitting the introduction of cooling or heating agent into the cooling or heating agent system. For example, the inflow may be applied to the steam drum 33 or the outer cover of the heat exchanger, preferably the inflow is located above the heat transfer modules to enable an easy filling of the cooling or heating agent system.

Additionally preferred is that the heat exchanger 30 when designed as a head condenser has secondary condensers 6 downstream of the heat transfer modules 3. Here, the term "downstream" means that the medium to be cooled is at first cooled in the heat transfer modules and subsequently the remaining gaseous medium is passed to the additionally secondary condensers. In these secondary condensers an additional condensation step takes place, wherein the resulting condensate is added to the remaining condensate and the remaining gaseous medium may be passed out of the heat exchanger or is re-passed into the condensation process. Preferably, the secondary condenser is applied directly to a heat transfer module (piggyback condenser) and has a discharge opening through the outer cover of the heat exchanger to the outside. Preferably, on each heat transfer module a secondary condenser is applied.

Further preferred is that the heat exchanger 30 comprises an apparatus cap 34 in the outer cover 2. When a steam drum 33 is used this can be integrated in the apparatus cap. This means that the steam drum is connected with the apparatus cap, for example welded, and thus the surface of the apparatus cap is reduced. The apparatus cap is applied to the heat exchanger using conventional devices. To remove the steam drum and/or the heat transfer modules 3 the apparatus cap together with the steam drum is removed upwards and through the resulting hole in the outer cover of the heat exchanger the heat transfer modules are withdrawn. By this construction the apparatus flange, which is more expensive and complex in preparation, is simplified and the steam drum together with the apparatus cap can be removed.

In an alternative and also preferred embodiment the apparatus cap 34 is not firmly connected with the steam drum 33, in particular in the embodiment, wherein the steam drum is located completely within the outer cover 2 of the heat exchanger 30. In this case, the apparatus cap may contain (but does not have to) one or more openings for the feed or discharge lines, respectively out of the steam drum.

Additionally preferred is that the heat exchanger 30 in the outer cover 2 has an opening 35 permitting the passageway to the inside of the heat exchanger. This opening may be formed as manhole 35, permitting the access of a worker to the inside of the heat exchanger.

The outer cover 2 of the heat exchanger 30 may have an arbitrary form. Preferably, it is cylindrical.

The heat transfer modules 3 may be arbitrary arranged within the outer cover 2 of the heat exchanger 30. Preferably, the heat transfer modules, viewed from above, are arranged around the centre of the reactor, as is shown for example in FIG. 4. Preferably, the steam drum 33 is arranged in the centre of the reactor. When no steam drum is present, preferably the cooling agent feed and discharge lines 4, 5, respectively, are brought together in the centre of the reactor. Preferably, at least four heat transfer modules are arranged around the steam drum in one plane. Further preferred is that the heat transfer modules are not only arranged in one plane but also on top of each other. Preferably, at least two planes, more preferred at least three planes with heat transfer modules are arranged in the heat exchanger.

Suitable cooling or heating agents that can be used for the heat exchanger 30 according to the invention are known to the skilled person and comprise for example water or water vapor, respectively.

The heat exchanger 30 according to the invention may be constructed as condenser or as reactor. A reactor in the sense of the present invention is suitable for performing catalytic reactions with strong heat tonality. Catalysts that are suitable for this are known to the skilled person and can be added to the reactor, preferably into the heat transfer modules 3, in an also known manner. Also in a known manner, a heat exchanger constructed as a condenser can be used in industrial plants. Preferably, the heat exchanger according to the invention is constructed as a head condenser. The heat exchanger according to the invention is particularly suited for the large-scale use and thus has preferably a height, width or depth of more than 2 m, more preferred of more than 4 m, still more preferred of more than 6 m. The upper limit is only determined by the buildability limits such as the length of the roller conveyor, present hoisting devices, etc.

Further preferred, the heat transfer modules have feed and discharge lines for an auxiliary medium supply. In this case, auxiliary media may be inert gases, purifier or other liquid or gaseous substances that should be available during the running of the heat exchanger for example in the heat transfer modules or on the outer surfaces. The auxiliary medium supply is separated from the cooling or heating agent supply and while the cooling or heating agent is maintained within the cooling or heating agent system the auxiliary medium enters the interior of the heat exchanger through which the medium flow or the media flow, respectively during the running. For example a washing liquor which can be used for the purification of the heat transfer modules without the need for taking them out of the heat exchanger may be passed by means of the auxiliary medium supply to the heat transfer modules. Subsequently, contaminated liquids can be drained through discharge lines at the bottom of the heat exchanger. However, the auxiliary medium supply may also be used for taking samples of the media in the heat exchanger in order to allow a better control of the reaction process. Preferably, also the auxiliary medium supply is designed such that the feed and/or discharge lines for the auxiliary media within the heat exchanger are brought together and can be fed in or withdrawn, respectively via one single opening in the outer cover of the heat exchanger.

A heat exchanger in the sense of the present invention is suitable for processes with different media. "Medium" means a fluid, in particular gases, liquids, and dispersed solids. The medium can also consist of gaseous and liquid parts. Preferably, the media are gases or mixtures of gases and liquids, most preferably gases. In the preferred embodiment as head condenser the media are preferably converted by condensation from the gaseous to the liquid state.

The heat exchanger according to the invention is further described in the FIGS. 3 and 4 with a head condenser, however, the invention relates also to reactors for the performance of chemical reactions not shown herein.

Figure 1:
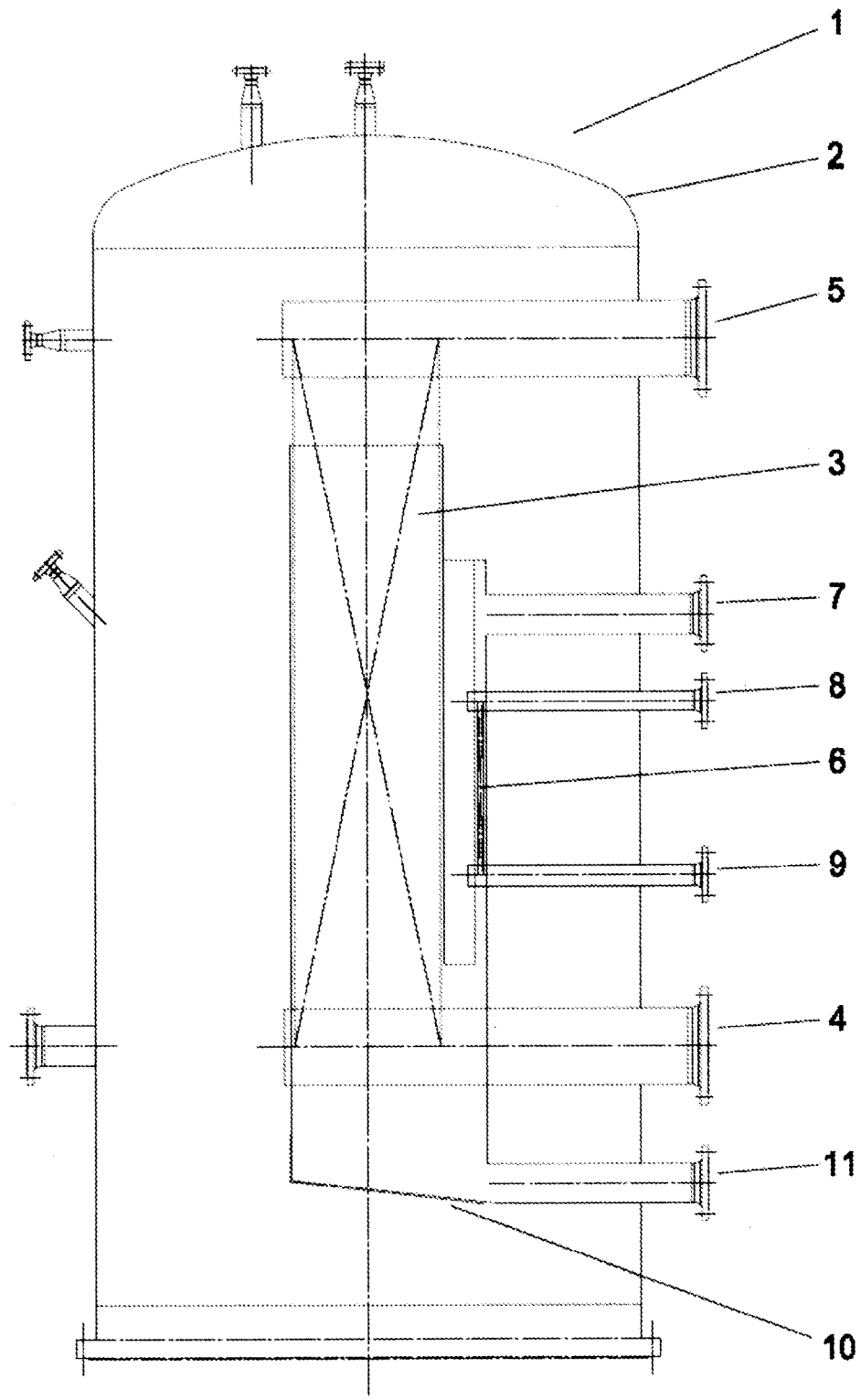
FIG. 1 shows schematically an already known head condenser with a heat transfer module and a secondary condenser.

FIG. 1 shows a head condenser 1 having an outer cover 2. Within the outer cover 2 a heat transfer module 3 is arranged that is formed as thermal sheet module. The thermal sheet module has a feed line 4 and a discharge line 5 for cooling water. Moreover, a secondary condenser 6 is applied to the thermal sheet module 3 that permits a downstream condensation. The not condensed gaseous medium may be passed out of the head condenser 1 through the discharge line 7 after passing the secondary condenser 6. Also the secondary condenser 6 possesses a feed line 8 and a discharge line 9 for cooling water. By the use of a collector with isolating bottom 10 the resulting condensate may be collected and passed out of the head condenser through the discharge line 11.

Figure 2:
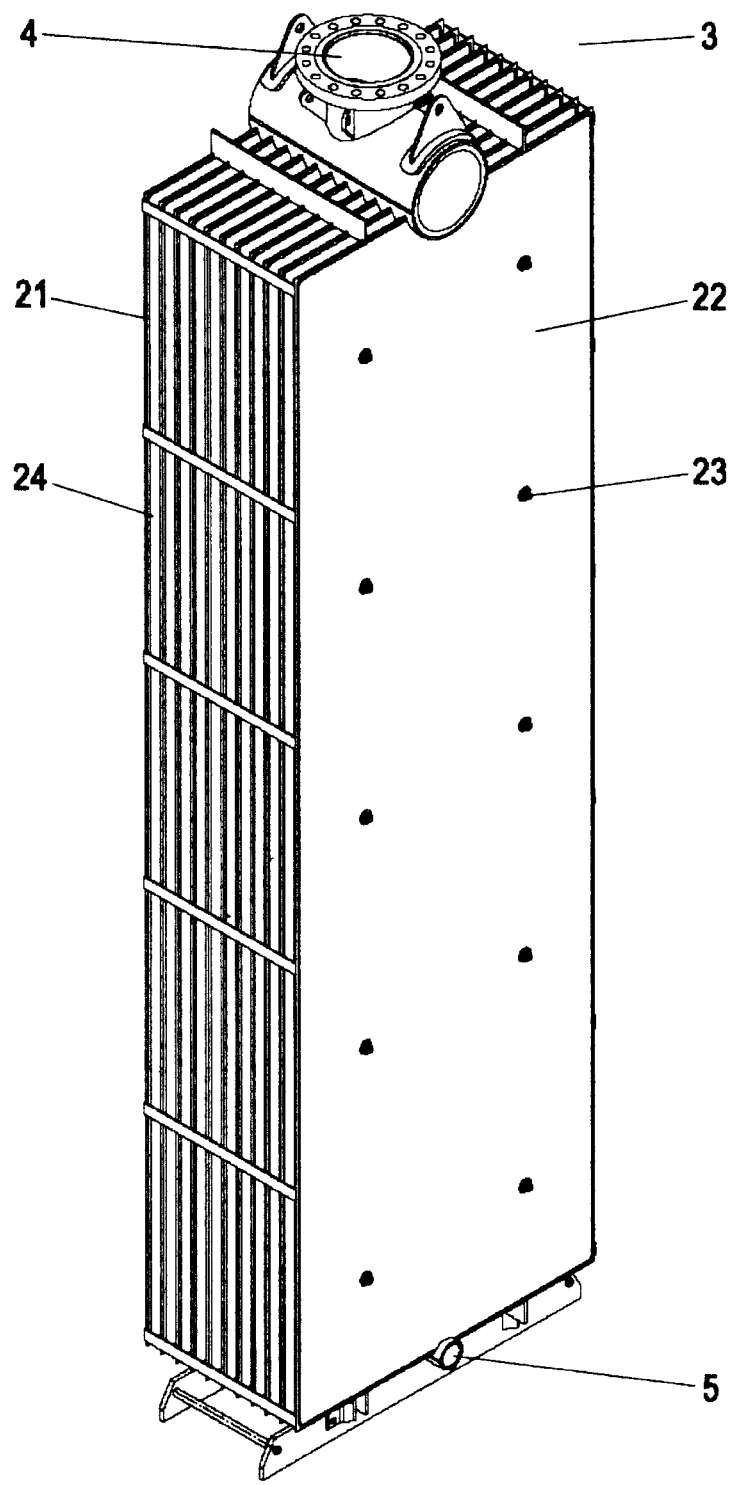
FIG. 2 shows a thermal sheet module.

FIG. 2 shows a heat transfer module representing a one-passage thermal sheet module 3. The thermal sheets 21 of the thermal sheet module 3 are connected with each other and have a closed side 22. The thermal sheet modules 3 may have fixing devices (for example through holes 23) at the closed side 22. Between the thermal sheets 21 of the thermal sheet module 3 there are interspaces 24 through which the media may flow during the running of the heat exchanger. When the heat exchanger is used as a reactor these interspaces 24 may be filled with a catalyst, for example as catalyst particles. The catalyst may also be present dispersed or dissolved in the fluid. When the heat exchanger is used as a head condenser these interspaces 24 may be empty or have devices that slow down the flow.

Figure 3:
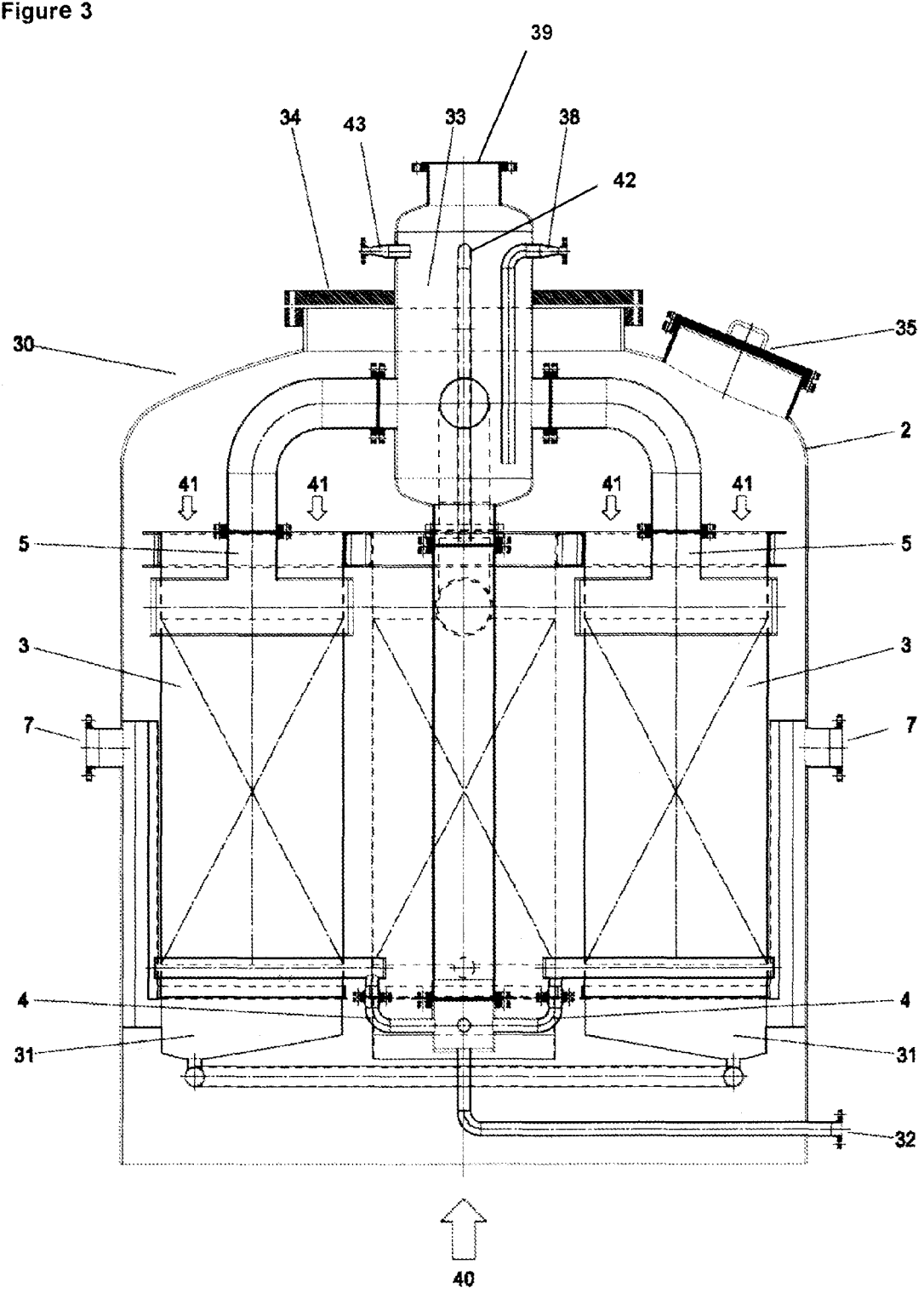
FIG. 3 shows a heat exchanger according to the invention.

FIG. 3 shows a heat exchanger 30 according to the invention having heat transfer modules 3 within the outer cover 2. The heat transfer modules 3 are formed as thermal sheet modules and have a feed line 4 as well as a discharge line 5 for a cooling or heating agent supply. Moreover, collectors 31 for collecting the condensate are applied underneath the heat transfer modules 3. The collectors 31 are connected with each other and the condensate may be passed out of the heat exchanger 30 by a discharge line (not shown). Additionally, the heat exchanger 30 possesses a lower outlet 32 through which cooling or heating agents can be removed from the heat exchanger 30. Additionally, the cooling or heating agent system of the heat exchanger 30 comprises a steam drum 33 connected with the feed lines 4 and the discharge lines 5 of the heat transfer modules 3. The heat exchanger 30 is closed by an apparatus cap 34 wherein the apparatus cap 34 is connected firmly with the steam drum 33. When the steam drum 33 is separated from the cooling or heating agent system it can be removed upwards together with the apparatus cap 34. The heat transfer modules 3 may be withdrawn through the resulting openings. To enable the access to the interior of the heat exchanger 30 the outer cover 2 of the heat exchanger 30 has a manhole 35.

Through the discharge line 7 the remaining gaseous media may be passed out of the interior of the heat exchanger 30. In a preferred embodiment (not shown) the discharge lines 7 are also brought together within the outer cover of the heat exchanger, so that irrespective of the number of heat transfer modules only one opening for discharging the remaining gaseous media from the heat exchanger has to be provided within the outer cover 2 of the heat exchanger 30. The steam drum 33 of the heat exchanger 30 has a measuring device 43. Further, the steam drum has a feed water inlet 42, a steam exhaust 39, and a water-level indicator 38. The heat exchanger 30 is designed as a head condenser. In the direction of the arrow 40 the media get into the interior of the heat exchanger 30. Then, the media will pass up in the heat exchanger 30 and enter the heat transfer modules 3 in the direction of the arrow 41 and condense there. The remaining not condensed gas may be passed out of the heat exchanger 30 by the discharge line 7 (optional). The condensate produced in the heat exchanger 30 is collected in the collectors 31 and then passed out of the heat exchanger by a discharging line.

Figure 4:
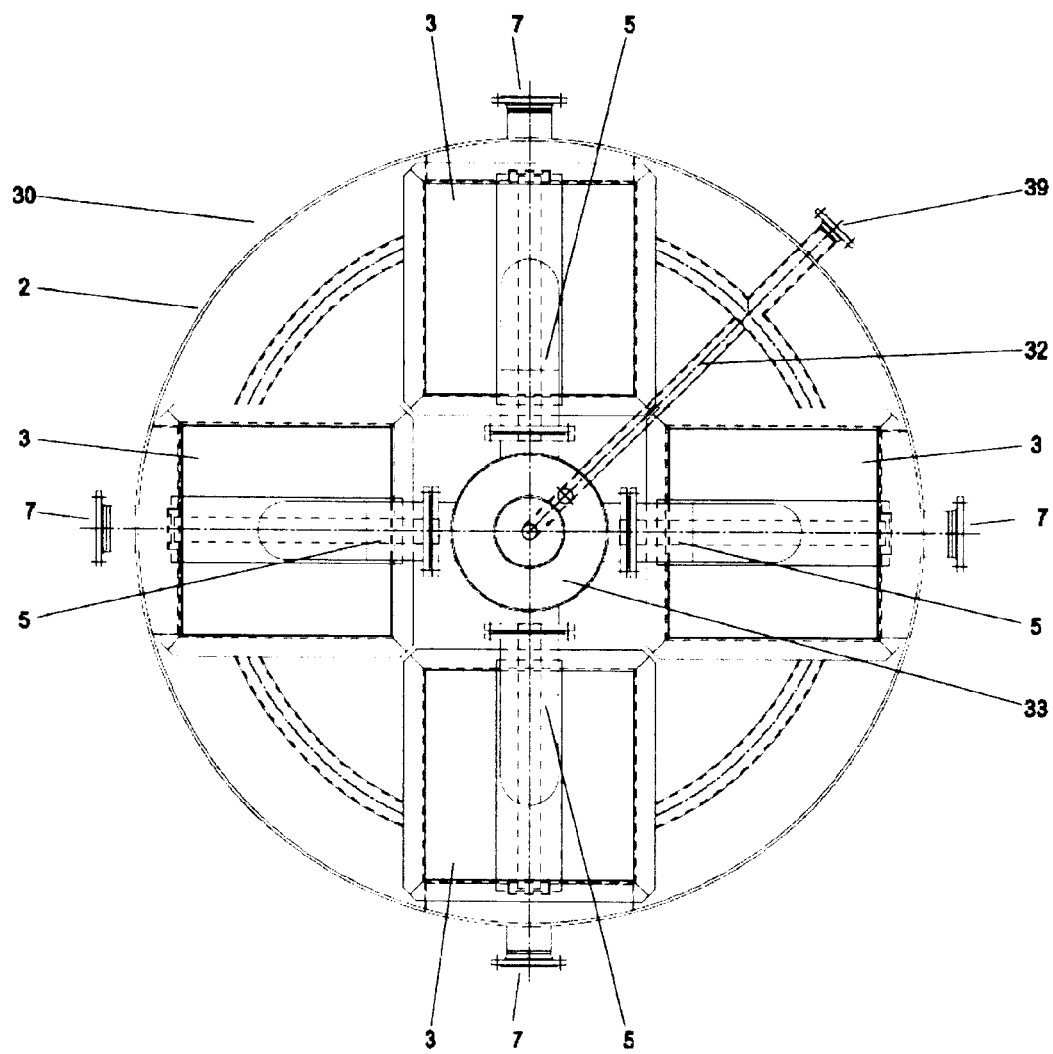
FIG. 4 shows a top view on the heat exchanger of FIG. 3.

FIG. 4 shows the heat exchanger 30 of FIG. 3 from above. There can be seen the centrally arranged steam drum 33 as well as four heat transfer modules 3 in the form of thermal sheet modules having discharge lines 5 for the cooling or heating agent. The outer cover 2 of the heat exchanger 30 has discharge lines 39 to remove the condensate. The discharge lines 39 lead to the interior of the heat exchanger 30 in the collector 31 (not shown in this view). Incidentally, reference is made to the embodiments for FIG. 4.

Figure 5:
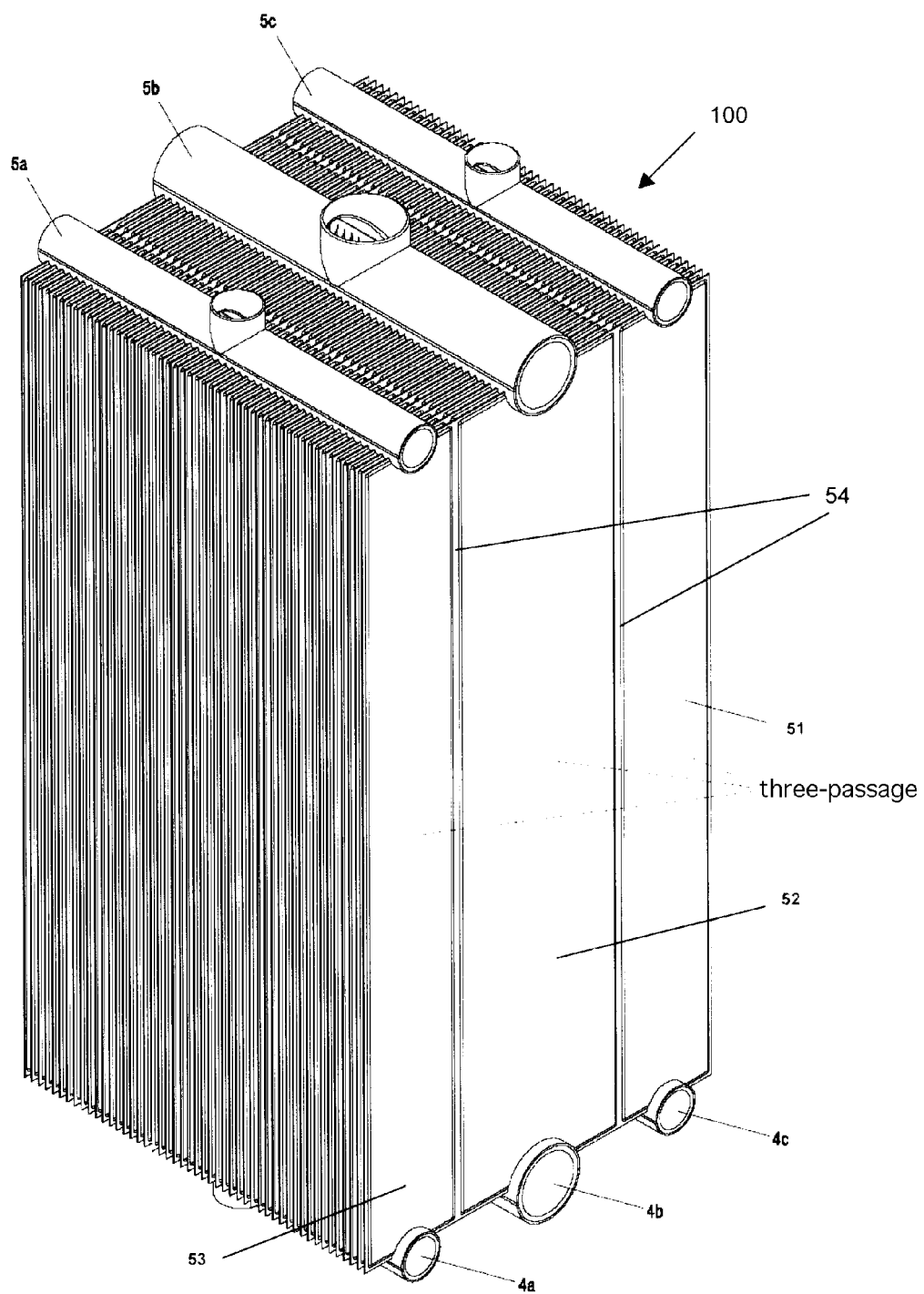
FIG. 5 shows schematically a three-passage thermal sheet module formed by dividing the thermal sheets into three passages.

FIG. 5 shows a thermal sheet module 100 build up of three-passage thermal sheets 51, 52, and 53. Three thermal sheet passages are formed by dividing conventional one-passage thermal sheets by longitudinal seams 54 into three passages. The corresponding passages are connected by common feed and discharge lines 4a, 4b, 4c, 5a, 5b, 5c. In one embodiment according to the invention the feed and discharge lines connected with the thermal sheet passages 51, 52, and 53 are brought together within the outer cover 2 (not shown) of the heat exchanger 30 (not shown) such as in the above-described embodiments.

Figure 6:
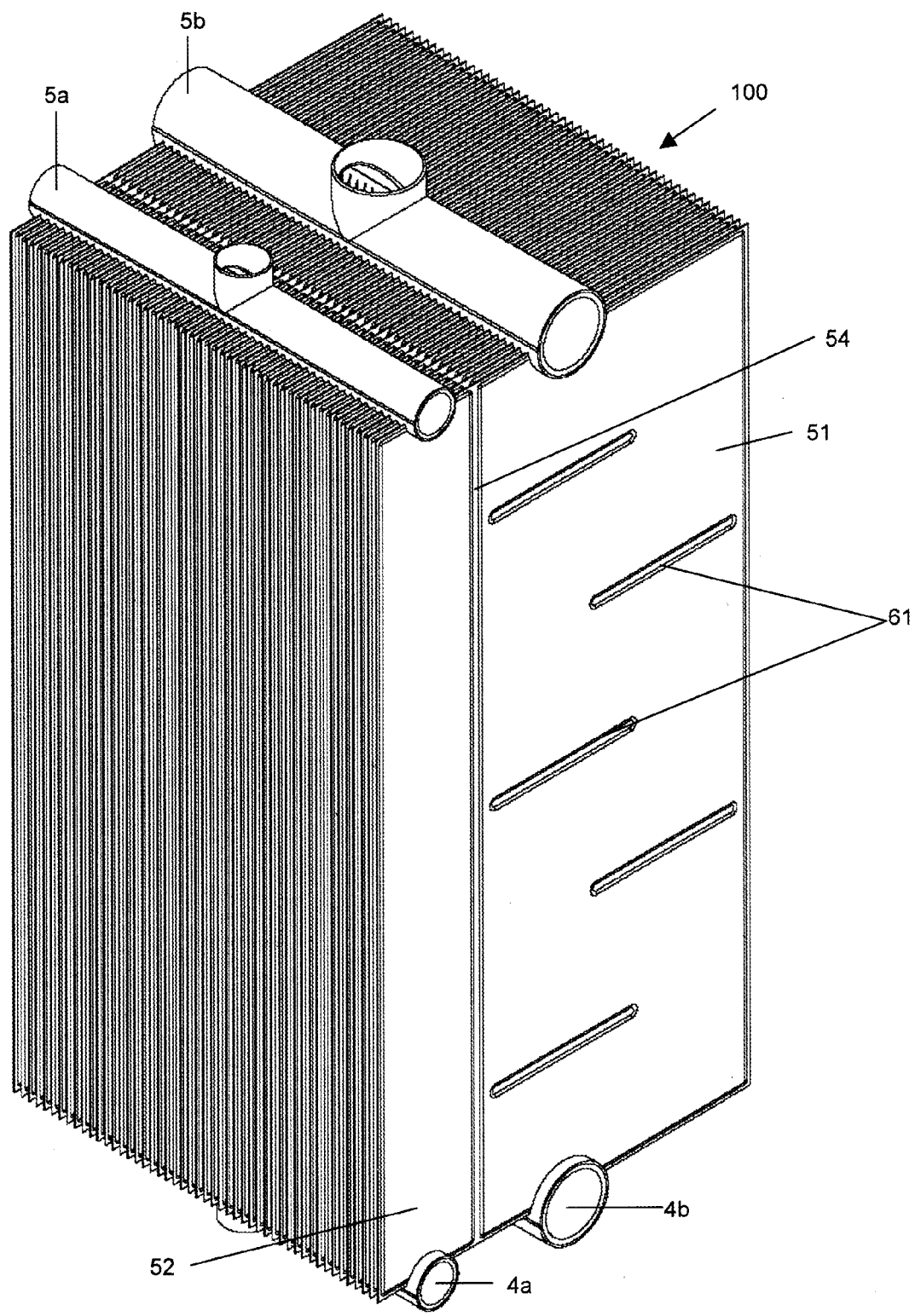
FIG. 6 shows a two-passage thermal sheet module having flow spoilers in a thermal sheet passage.

In analogy to FIG. 5 FIG. 6 shows a thermal sheet module 100 wherein this is build up of thermal sheets having two thermal sheet passages and one of the passages 51 is provided with flow spoilers 61, for example by means of rolling or welding seams, by which the way of the media within the passage can be affected and better controlled, respectively.

In particular, by the flow spoilers 61 in the passage 51 the flow path of the medium through the passage 51 is lengthened.

This embodiment is of particular advantage for example to produce greater differences in temperature within the thermal sheet module 100. When the same medium is passed through the passages 51 and 52 (preferred embodiment) the area 51 of the thermal sheet module 100 is heated up more than the area 52 of the thermal sheet module, since the temperature within the area 51 can not be discharged as rapidly as in the area 52. Such a heterogeneous course of temperature within a thermal sheet module may be of advantage for certain applications. Of course, the heterogeneity of the course of temperature can still be enhanced when different media are passed through the passages 51 and 52 wherein in this case the feed lines and the discharge lines 4a, 4b, and 5a, 5b cannot be connected.

Figure 7:
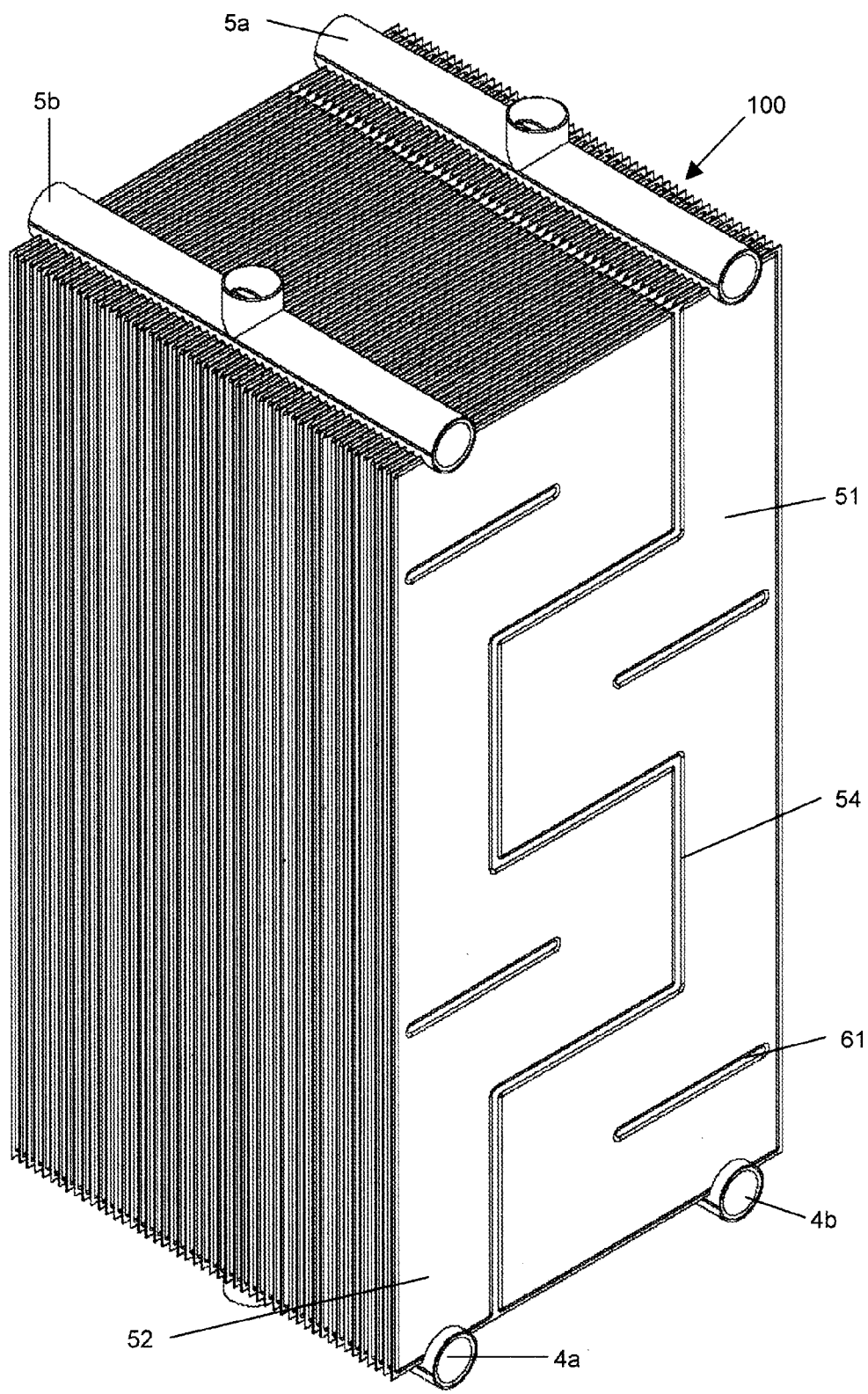
FIG. 7 shows a two-passage thermal sheet module with a non straight-line longitudinal seam and flow spoilers.

FIG. 7 shows a two-passage thermal sheet module 100 wherein in analogy to FIG. 6 both passages 52 have flow spoilers 61 and the longitudinal seam 54 does not exhibit a straight-line but a curved course. In this embodiment the flow paths of the medium in both passages 51 and 52 have the same length but in total are lengthened by the flow spoilers.

This embodiment is of particular advantage for example to reach a temperature distribution over the whole area of the thermal sheet module that is as uniform as possible. For that, the medium in the passage 51 can be passed from the feed line 5a to the discharge line 4b and in the passage 52 from the feed line 4a to the discharge line 5b (countercurrent principle). During the flow through the passages the medium is heated and is thus cooler at the entry point than at the exit point (when the medium is used as a cooling agent). Thus, the two-passage design of the thermal sheet module with the corresponding curved way provides in this process control a particularly uniform temperature distribution that cannot be achieved in the known one-passage thermal sheet modules.

Figure 8:
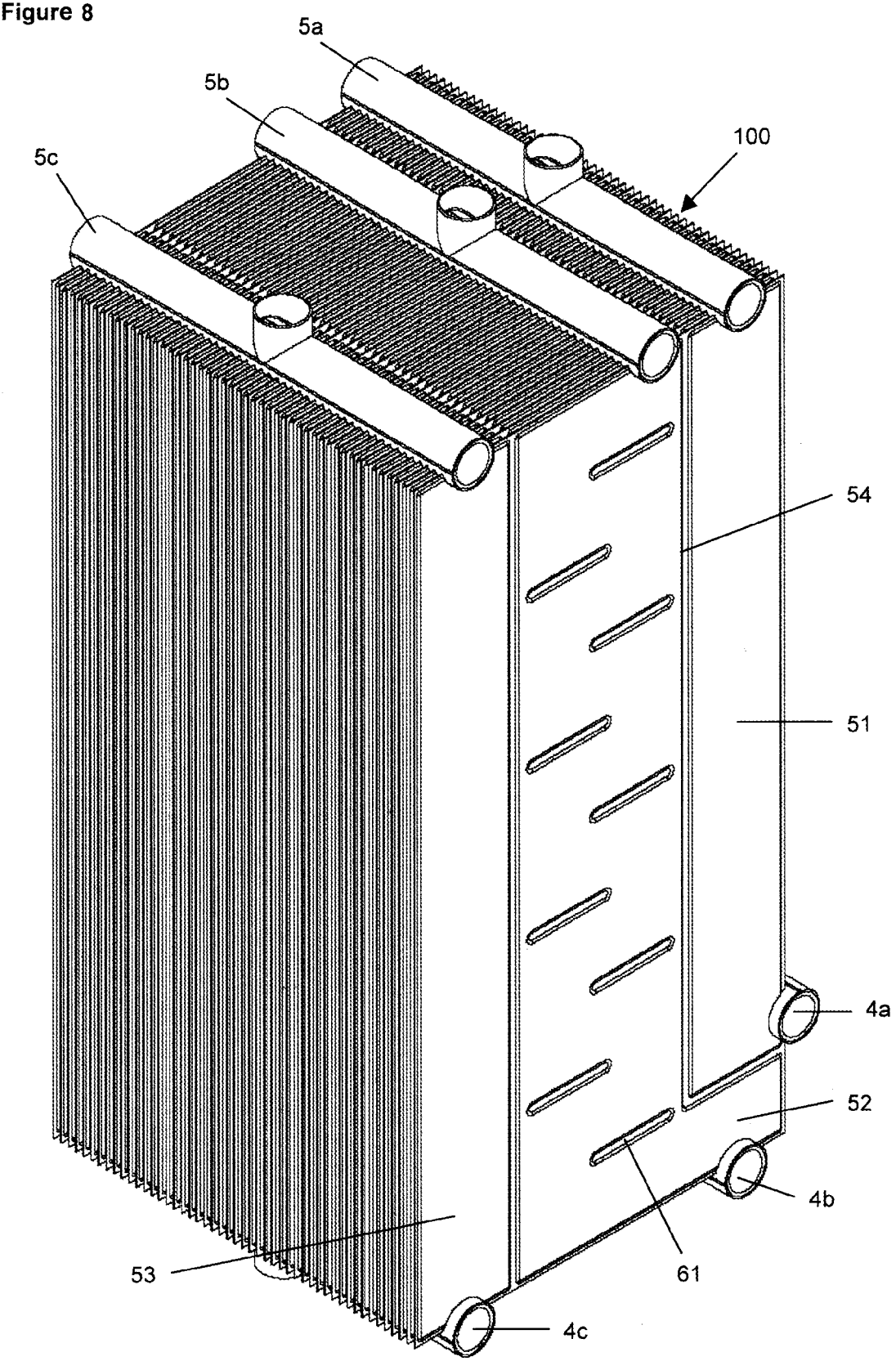
FIG. 8 shows a three-passage thermal sheet module with a shortened thermal sheet section.

FIG. 8 shows a three-passage thermal sheet module 100 wherein one of the passages 52 has the flow spoilers 61 described in FIG. 6 and the other 51 does not extend over the full height of the thermal sheet, so is shortened. Accordingly, the adjacent thermal sheet section 52 extends over the shortened area. Consequently, also the feed line 4a is located at the lateral instead of the lower border of the thermal sheet module.

In contrast to the embodiment in FIG. 7 by this embodiment adjusting very heterogeneous temperature profiles within the thermal sheet modules is possible.

Figure 9:
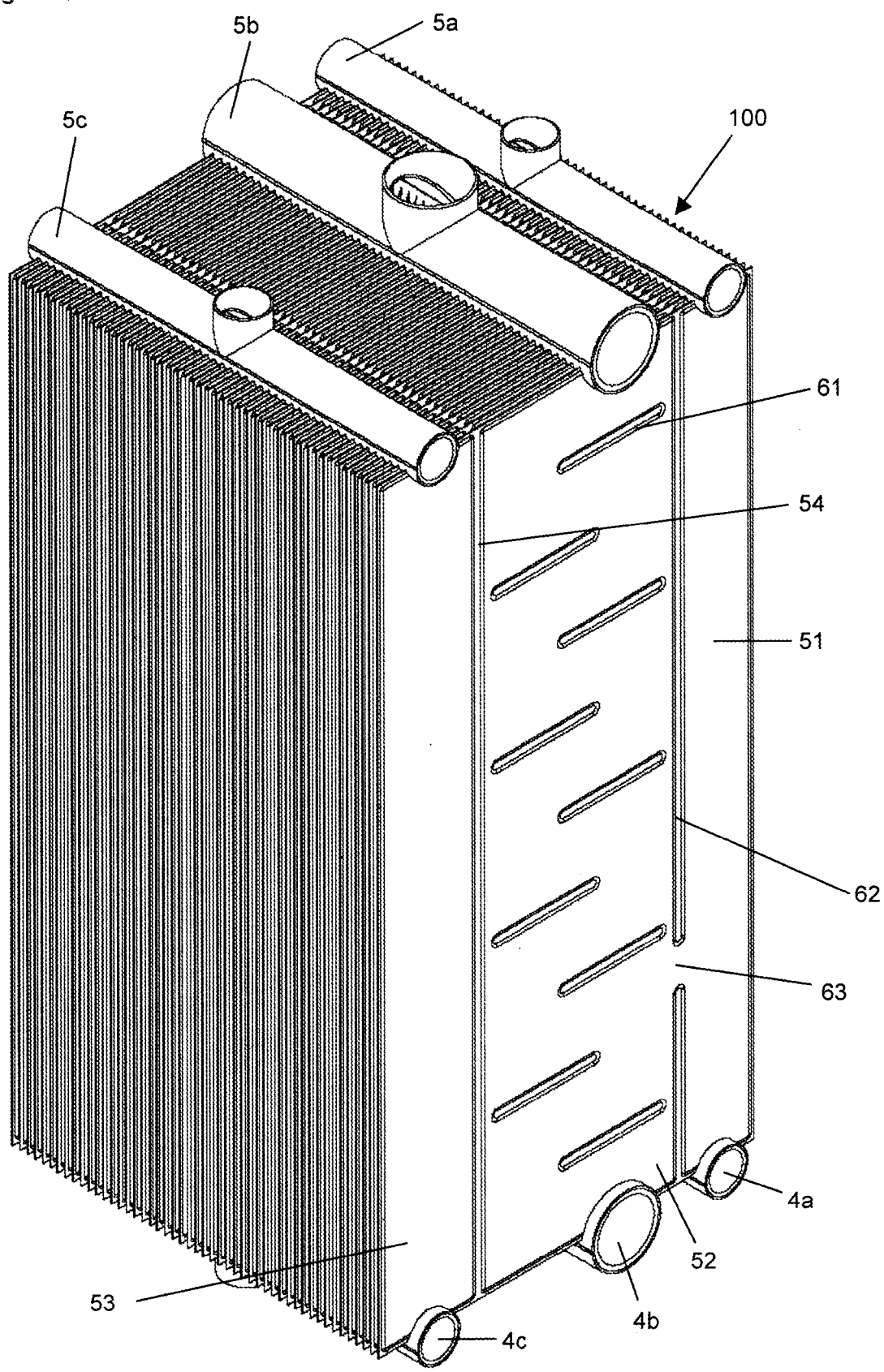
FIG. 9 shows a three-passage thermal sheet module wherein admixing of side flows through an interrupted longitudinal seam is possible.

FIG. 9 shows a three-passage thermal sheet module 100 wherein one of the passages 52 has the flow spoilers 61 described in FIG. 6 and either of the longitudinal seams 62 is interrupted at a particular point 63 so that a passageway for a fluid is formed by which side flows may be admixed.

This embodiment is in particular of advantage when it is intended to perform chemical reactions within the thermal sheets. Here, for example in the passage 52 the educts of a chemical reaction may be passed, in passage 51 the catalyst to perform the reaction. In this embodiment the cooling and heating agent, respectively adjusting a particular temperature profile along the longitudinal direction of the thermal sheets may be outside of the thermal sheets. The opening 63 allows for the catalyst to be brought together with the reaction educts at a specific temperature and the reaction is started at a well-defined temperature which can be of advantage for certain reactions. Then, through the passage 53 again a cooling or heating agent may be passed supporting the maintenance of the desired course of temperature within the thermal sheet module.

What is claimed is:

1. A heat exchanger (30) comprising: an outer cover (2), at least 2 heat transfer modules (3, 100), and first and second feed and discharge lines (4, 5) connected with the heat transfer modules (3, 100) for supply of a cooling or heating agent, wherein said first and second feed or discharge lines (4, 5) are brought together within the outer cover (2) of the heat exchanger (30), further wherein at least one of said heat transfer modules is a thermal sheet module (100) comprised of a plurality of thermal sheets, wherein:
   each of said plurality of thermal sheets is characterized by first and second opposed ends, further wherein each of said plurality of thermal sheets is divided into at least first and second passages (51, 52) by means of rolling or welding seams;
   each of said first and second passages comprises a unique fluid inlet disposed at said first opposed end and unique fluid outlet disposed at said second opposed end;
   said plurality of thermal sheets are connected such that a first set of first passages share a first common feed line (4a) and a first common discharge line (5a) while a second set of second passage share a separate second common feed line (4b) and second common discharge line (5b), wherein said first and second common feed lines are disposed at the first opposed end of said plurality of thermal sheets and the first and second common discharge lines are disposed at the second opposed end of said plurality of thermal sheets; and
   the thermal sheet module circulates at least a first cycle of media through said first set of first passages and a second cycle of media through said second set of second passages, wherein said first and second cycles of media differ in terms of volume flow, flow rate, flow direction, temperature profile, heat capacity, state of aggregation, heating agent or cooling agent,
   wherein at least one of said rolling or welding seams (62) between passages is interrupted at at least one point (63) so as to allow media flowing in said first set of passages to contact media flowing is said second set of passages and enter into a chemical reaction.

2. The heat exchanger (30) according to claim 1, wherein at least one of said first and second passages is provided with flow spoilers (61).

3. The heat exchanger (30) according to claim 1, wherein the first and second feed lines (4) connected with the heat transfer modules (3, 100) are brought together within the outer cover (2) of the heat exchanger (30) by means of a steam drum (33).

4. The heat exchanger (30) according to claim 3, wherein the steam drum (33) is arranged within the outer cover (2).

5. The heat exchanger (30) according to claim 3, wherein the steam drum (33) is detachable from a central cooling or heating agent supply and removable from the heat exchanger (30) in a vertical direction.

6. The heat exchanger (30) according to claim 1, wherein the heat transfer modules (3, 15) are detachable from a central cooling or heating agent supply and removable from the heat exchanger (30) in a vertical direction.

7. The heat exchanger (30) according to claim 1, wherein supply of a central cooling or heating agent can be operated in the natural circulation.

8. The heat exchanger (30) according to claim 1, wherein each of the thermal sheets is divided into at least first, second and third passages by means of rolling or welding seams, with each of said first, second and third passages comprising a unique fluid inlet and unique fluid outlet such that the thermal sheet module circulates at least a first cycle of media through each of said first passages, a second cycle of media through each of said second passages, and a third cycle of media through each of said third passages.

9. The heat exchanger (30) according to claim 1, wherein each of the thermal sheets is divided into at least first, second, third and fourth passages by means of rolling or welding seams, with each of said first, second, third and fourth passages comprising a unique fluid inlet and unique fluid outlet such that the thermal sheet module circulates at least a first cycle of media through each of said first passages, a second cycle of media through each of said second passages, a third cycle of media through each of said third passages, and a fourth cycle of media through each of said fourth passages.

10. The heat exchanger (30) according to claim 1, wherein each of the thermal sheets is divided into at least first, second, third, fourth and fifth passages by means of rolling or welding seams, with each of said first, second, third, fourth and fifth passages comprising a unique fluid inlet and unique fluid outlet such that the thermal sheet module circulates at least a first cycle of media through each of said first passages, a second cycle of media through each of said second passages, a third cycle of media through each of said third passages, a fourth cycle of media through each of said fourth passages, and a fifth cycle of media through each of said fifth passages.

11. The heat exchanger (30) according to claim 1, wherein said rolling or welding seams that divide each of said plurality of thermal sheets into at least first and second passages (51, 52) comprise longitudinal seams.

* * * * *